ized 350-416

United States Patent

[11] 3,628,027

| [72] | Inventor | Gustav Brauss<br>Goldach, Switzerland |
| --- | --- | --- |
| [21] | Appl. No. | 885,805 |
| [22] | Filed | Dec. 17, 1969 |
| [45] | Patented | Dec. 14, 1971 |
| [73] | Assignee | Sulzer Brothers, Ltd.<br>Winterthur, Switzerland |

[54] BEAM DEFLECTING AND FOCUSING MEANS FOR PHOTOELECTRIC MONITORING, COUNTING OR CONTROL APPARATUS
4 Claims, 1 Drawing Fig.

[52] U.S. Cl. .......................... 250/216,
350/175 SL, 350/199, 350/202
[51] Int. Cl. .......................... G02b 3/00,
G02b 17/00, H01j 39/12
[50] Field of Search.......................... 250/216;
350/175 SL, 199, 202

[56] References Cited
UNITED STATES PATENTS

| 2,968,228 | 1/1961 | Merritt.......................... | 350/175 SL |
| --- | --- | --- | --- |
| 3,263,087 | 7/1966 | Goldman et al. .............. | 250/216 X |

Primary Examiner—Archie R. Borchelt
Assistant Examiner—T. N. Grigsby
Attorney—Kenyon & Kenyon Reilly Carr & Chapin ABSTRACT: The beam deflecting and focusing system includes a lens member of approximately spherical shape formed of two transparent substantially hemispherical parts as well as a partly reflective partly transparent mirror located in the contact plane between the two hemispherical parts. The mirror is arranged to reflect light from a light source to a reflector outside the lens members and to transmit reflected light from the reflector onto the photocell.

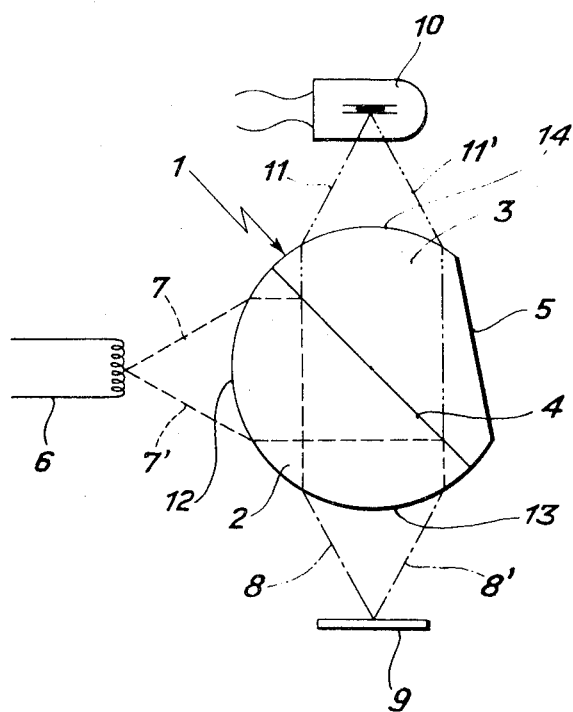

BEAM DEFLECTING AND FOCUSING MEANS FOR PHOTOELECTRIC MONITORING, COUNTING OR CONTROL APPARATUS

This invention relates to a beam deflecting and focusing means for monitoring counting or control apparatus and particularly for photoelectric apparatus.

It has been known that combined lens and mirror systems, generally comprising at least two lenses and one partly reflecting, partly transparent mirror, have been frequently employed in photoelectric monitoring counting or control apparatus for focusing a light beam emitted from a light source (e.g., as shown in Swiss Pat. No. 344,783) a part of the reflected beam. In such systems, the light beam has been reflected by a reflector and thereafter by the mirror and focused on has been deflected and transferred to a photocell. For example, in one known system the light beam has been guided in a manner similar to that employed, although for a completely different purpose, in the Michelson interferometer. One leans is disposed near the light source and initially projects a focused beam on to a partially transmissive mirror disposed at an angle to the transmission orientation of the working light beam. This mirror deflects part of the beam coming from the light source onto a reflector. If not interrupted by a transient opaque foreign body or by a casual displacement of the reflector, part of the reflected light beam subsequently passes straight through the partly transparent mirror and is focused by means of a second lens onto a photocell which activates the control apparatus. The positions of the light source and the photocell may be interchanged without altering the properties of such a detector system. An important advantage of such an arrangement resides in the fact that both the light source and the photocell are located on the same end of the detecting light beam, with the effect that only this end has to be equipped with a power supply. The reflector at the remote end is passive and can be attached to and be used to detect the position of a movable supporting element. As is apparent, the manufacture of these various elements and the method of aligning them is complicated and prone to trouble, particularly if they must be constructed in very small sizes due to lack of space. Furthermore, in order to ensure reliable functioning of the system, it has been necessary for all parts to be specially protected against dust deposits and other external effects.

Accordingly, it is the object of the present invention to provide beam deflecting and focusing means for photoelectric monitoring and control apparatus in which the required lenses and a partly transparent mirror are combined in a single, sealed element which is protected against external effects.

It is another object of the invention to provide a beam deflecting and focusing apparatus which is easily alignable.

It is another object of the invention to provide a reliable accurate beam deflecting and focusing apparatus.

It is another object of the invention to provide a relatively small compact unit.

It is another object of the invention to be able to simply construct a reliable beam deflecting and focusing apparatus.

Briefly, the invention provides a beam deflecting and focusing apparatus which comprises a totally enclosed, at least approximately spherical, lens member formed of two parts which are substantially of hemispherical or segmental-shape and are joined along a common contact plane as well as a partially light transmissive and reflective mirror disposed in the common plane. The spherical lens member has three surface portions or window apertures thereon which are oriented with respect to elements such as a light source, reflector and photocell so as to transmit light and so that he contact plane of the parts extends at an angle to the transmission orientation of the light beams. For example, the first two of the spherical surface portions are pointed respectively towards the light source and the photocell, in symmetrical position one to each other with respect to the mirror plane, whereas the third surface portion is diametrically opposed to one of the first two portions and is directed towards the reflector.

The beams coming from the light source enter the first surface portion and are thereby focused to a substantially parallel beam, a part of which is deflected by the partly reflective, partly transparent mirror to step out of the lens member through the third surface, being focused onto the reflector.

As long as the path of the light beam between the lens member and the reflector is free and undisturbed, the reflector being located in its correct position, the incident light beam will be reflected by 180° and the reflected beam reenters the third surface of the lens member and part of it passes straight through the partly transparent mirror, then through the second surface and is focused onto the photocell which controls the function of the monitoring system in a known manner e.g., in a manner as described for the photocell 54 in U.S. Pat. No. 3,411,548).

Referring to the mirror plane, as the light source and the photocell are arranged at symmetrical positions, the virtual image of each one of these elements coincides with the real position of the other one. Obviously, the general array and the external function of such a system would not be altered by inverting the positions of the source and the photocell and inversing the direction of the light beam.

Since it is merely necessary to determine the spatial path of a light beam in the beam deflecting and focusing apparatus, since the light beam is of the kind used in a photoelectric device such as a light barrier, monitoring or counting means, or control apparatus and therefore no focused projection, for example of an object, is required, the optical accuracy of the surface portions forming the lenses of the deflecting means need not comply with very stringent requirements in contrast to the conditions which are known, for example, in the case of a mirror-reflex photographic camera. All elements required for focusing and deflecting the light beam may be combined in a compact enclosed sphere. The two hemispherical or segmental parts of the member may be either constructed initially as individual pieces or can be constructed by cutting a sphere in two halves, and can be of a material such as glass or some other known transparent plastic material. In one embodiment, both parts of the sphere are cemented to each other by means of a transparent adhesive.

In one embodiment, the parts forming the spherical member may be substantially of identical shape. This achieves a further simplification of construction since identical blanks may be employed for both parts.

In a further embodiment, the external surface of the spherical member is covered with an opaque, light absorbent coat with the exception of the above-described three surface portions or window apertures intended for the path of the light beam. External light, interfering with the photocell, may be substantially avoided.

Also, the surface of the spherical member may be flattened on at least one part, preferably diametrally opposite the first or second window aperture, and is located in angular relation with the reflected beam axis. This allows light from the transmissive mirror to be dispersed within the spherical member, or when the flat surface is opaque, to be absorbed. The flattened surface or surfaces also can be used especially in case of an opaque coated surface, to locate the position of the partially transparent mirror in a simple manner when the spherical lens and mirror member is to be installed in place so that the mirror is situated in the correct position.

These and other objects and advantages of the invention will become more apparent from the following detailed description and appended claims taken in conjunction with the accompanying drawings in which:

The drawing illustrates a beam deflecting and focusing elements of the invention together with other elements of a photoelectric control apparatus.

Referring to the drawing, a spherical member 1 is formed of two transparent hemispheres or segments 2, 3 which are cemented together on a partially transparent mirror 4. The spherical member 1 is positioned in the path of the light beams from alight source 6 and reflector 9 to a photocell 10 so that the partially transparent mirror 4 is positioned at an angle to the axial direction of the light beams, for example at an angle of 45°. The sphere part 3 shown to the right in the drawing is provided with a flattened surface or zone 5 which is angularly disposed to the mirror 4 and which may be provided with a light-absorbing paint coating. The entire surface of the member 1 may be covered with a layer of mat, black-covering paint and may be opaque to light with window apertures being provided in the paint coating at positions 12, 13 and 14 to enable light to pass through.

The method of operation of the spherical member 1 is described hereinbelow. A light beam 7, 7' emitted by the light source 6 strikes the surface of the spherical member 2 at window aperture or surface portion at position 12 and is refracted or focused by this surface in such a way as to strike the partially transparent mirror 4 in the form of parallel individual beams. The mirror 4 then deflects part of the parallel beams at right angles in the downward direction, as viewed, where the beams are focused into a convergent pencil of rays 8, 8' when leaving the surface portion 13 of the hemispherical part 2. The pencil of rays 8, 8' then strike the reflector 9. The reflector 9 may comprise one of the known reflecting means, for example, a so-called cat's eye or scotch light adapted to reflect the incident light substantially back into the incident direction.

That part of the parallel beams which is transmitted straight through the partially transparent mirror 4, strikes the flattened zone 5 from the interior. As this zone is slightly inclined relative to the incident direction, the beams are absorbed by the paint coating or, to the extent to which this is not the case, are dispersed in all directions within the sphere 1 so that the directed light beam is not disturbed thereby.

The reflector 9 reflects the pencil of rays 8,8' onto the window aperture of surface 13 of the hemispherical part 2 which acts as a condenser lens to deflect the returning pencil of rays 8, 8' into parallel individual rays. A part of these rays then pass through the partially transparent mirror 4 and on leaving the part 3 of the spherical member 1 at window aperture or surface portion at position 14 are once again focused into a pencil of rays 11, 11' directed towards the photocell 10. The other part of the rays are reflected by the partially transparent mirror 4 to emerge at window aperture or surface portion at position 12 from the spherical member 1 and are projected back to the light source 6 in the form of pencil rays 7, 7'. Apart from a constant attenuation of the light which strikes the photocell 10, this proportion has no effect on the functioning of the photoelectric control system.

It is noted that the spherical member 1 may be mounted in any desired member in a housing or in open form and may be combined with the light source 6 and the photocell 10. It is merely necessary to ensure that the plane of the partially transparent mirror 4, extending through the center of the spherical member 1, coincides with the plane of symmetry between the position of the light source 6 and that of the photocell 10. The partially transmissive mirror 4 need not therefore be disposed at an angle of 45° relative to the beams which pass straight through the spherical member between window apertures 13 and 14. Instead, the mirror 4 can assume any desired other angle relative to the beams. In such an event, the window aperture 12 must then be displaced accordingly on the spherical surface so that the apertures 12, 14 are disposed symmetrically relative to the plane of the mirror 4.

The functioning of the beam deflecting and focusing apparatus is not impaired if the photocell is installed in the position of the light source and the light source is installed in the position of the photocell.

By suitable selection of the refractive index of the material employed for the hemispherical parts and by appropriate selection of the distances of light source and photocell from the spherical member 1, it is possible for the distance to the reflector 9 to be selected at any theoretical value. However, the apparatus of the invention is particularly suited for control apparatus having dimensions which are as small as possible, that is, also having a short distance between the sphere 1 and the reflector 9.

The described photoelectric system ban be used to detect any change in the optical properties occurring on the reflector branch of the light beam path. For example, the system can be used in place of the photocell arrangement described in U.S. Pat. No. 3,411,548.

What is claimed is:

1. In combination with a light source, a reflector and a photocell; a beam deflecting and focusing lens and mirror system for photoelectric monitoring, counting or control apparatus comprising a lens member of approximately spherical shape formed of two transparent, substantially hemispherical parts joined and sealed together along a common contact plane and a partly reflective partly transparent mirror within said member located in said contact plane; said lens member having three spherical surface portions thereon for the passage of light therethrough, the first two of said spherical surface portions being pointed respectively towards said light source and said photocell and in symmetrical position one to each other with respect to said mirror, the third spherical surface portion being diametrically opposed to one of said first two surface portions and directed towards said reflector for transmitting and focusing a working light beam from said light source through said lens member onto said reflector and subsequently from said reflector back through said lens member onto said photocell.

2. The combination as set forth in claim 1 wherein the surface of said lens member is coated with an opaque light-absorbing material about said three spherical surface portions, each of said surface portions forming a window aperture for transmitting and focusing said working light beam passing through said member.

3. The combination as set forth in claim 1 wherein said lens member has at least one flat surface portion substantially diametrically opposed to the second one of said first two symmetrical surface portions and disposed in angular relation to the working light beam passing through said lens member, to disperse, attenuate and prevent any unwanted random light from interfering with the working light beam.

4. The combination as set forth in claim 1 wherein said two hemispherical parts of said lens member are substantially of the same shape.

* * * * *